US005873591A

United States Patent [19]

Keller

[11] Patent Number: 5,873,591

[45] Date of Patent: Feb. 23, 1999

[54] ACCESSORY DEVICE AND MOUNT FOR WHEELCHAIR

[76] Inventor: Richard D. Keller, 6416 Fourth Ave., Takoma Park, Md. 20912

[21] Appl. No.: 808,198

[22] Filed: Feb. 28, 1997

[51] Int. Cl.[6] .......... B62K 15/00

[52] U.S. Cl. .......... 280/304.1; 74/551.4

[58] Field of Search .......... 280/304.1, 250.1, 280/304.5; 74/543, 551.1, 551.4; 297/DIG. 4

[56] References Cited

U.S. PATENT DOCUMENTS

| | | | |
|---|---|---|---|
| 3,398,974 | 8/1968 | Edwards et al. | 280/304.1 |
| 3,999,778 | 12/1976 | Markiel | 280/304.1 |
| 4,455,046 | 6/1984 | Linderoth | 280/304.1 |
| 4,759,562 | 7/1988 | Vinyard et al. | 280/304.1 |
| 5,141,242 | 8/1992 | Henzel | 280/304.1 |
| 5,697,628 | 12/1997 | Spear | 280/304.1 |

*Primary Examiner*—Kevin Hurley
*Attorney, Agent, or Firm*—Arthur Eglington

[57] ABSTRACT

A pair of upwardly projecting, readily displaceable, push-up handles which are selectively mountable on the lateral bars of a wheelchair framework. The handle mounting means for each side includes a tubular member that is fixed between the upper and lower rigid frame members of the wheelchair via a pair of dual U-ring interconnecting bracket means which secures the first tubular member to the frame members in a variable inclined position mode. A second tubular member of an outer diameter somewhat reduced and is adapted at its one longitudinal end to engage telescopically the open upper longitudinal end of the first member. At the upper longitudinal end of the second member is optionally located, a replaceable resilient gripping means. The second tubular member is retained within the first member by a tensioned cord means located inwardly and longitudinally of the conjoined members, which cord is sized to require elongation sufficiently to bias the engaged members into a secure interconnecting relation while serving as a set of push-up bars for the seated invalid. The cord-induced tube engagement bias can be readily overcome by manual effort to be displaced from the telescopic connection and to hang freely along the wheelchair lateral framework.

7 Claims, 2 Drawing Sheets

20
22
24
24R
26
28U
28L
30R
32R
32L
34U
36
36L
38U
38L
40
42
44
45
46U
46L
48L
50U
6
7

34U
52
28U
34L
32R 70A
70B
50U
50L
52
38U 54
56
58

66L
60

32
54
42
24R 32
62A
54
62C
56
62D 24R
62
60

62A
58
54
56
62D
24R
42
60B
32R 66U
68U
64U
62A
62C
56
62D
60
64
64L
68L
66L

ACCESSORY DEVICE AND MOUNT FOR WHEELCHAIR

FIELD OF THE INVENTION

This invention relates to a wheelchair provided with an accessory device serving as an at-will, push-up hand gripping bars.

BACKGROUND OF THE INVENTION

Many disabled and paraplegic persons rely substantially on a wheelchair, and quite a few of them, despite major body paralysis, are relatively self-sufficient, requiring but limited human assistance in their everyday mobilities. There are several devices available to assist invalids in dealing with everyday activities. Cumble U.S. Pat. No. 5,040,813 is to an accessory holder and mount for a wheelchair, and Scheulderman U.S. Pat. No. 5,263,768 is to a wheelchair with an improved adjustable backrest.

One overlooked need is an apparatus, to be readily available at the chairside, which will permit the wheelchair occupant right himself to an upright sitting position using compromised arm strength; this precludes the need for another person to provide for torso uplifting or providing extra assistance moving out of the wheelchair. Such a device should also be readily displaceable, so as not to unduly cramp, or annoy, the chair user during his other varied seated activities which might include being at a table, which could interfere with the now-displaced second member.

It is, therefore, an object of the invention to provide an accessory device which can easily be adapted to mounting on each lateral framework of a modem wheelchair, can be made quickly operative, and can just as readily be displaced to reside in a non-interfering mode, during other chair-bound activities.

It is another object of the invention to provide a self-levitating means for an invalid which is in a better position than that which is offered by standard arm rests, or the wheel brake levers, which are serving as the interim means for an occupant's shifting and lifting himself.

It is yet another object of the invention is to provide a displaceable wheelchair accessory which facilitates invalid shifting while still seated, aiding in pressure sore prevention, which is a problem for all wheelchair users, especially those with spinal cord injuries that compromise normal nervous sensations in the buttocks area.

A further object of the invention is to provide a body shifting device for those invalids with sufficient limited upper body (torso) control by providing a push-up device that permits facile transient unweighting of the buttocks, the leaning forward for manual actions, and also for the easy return to the upright seated posture.

Still another object of the invention is to provide a device that safely replaces extended brake levers for wheelchairs, which levers are usually not intended to support the major weight of an invalid's head, torso and upper limbs, in the course of body levitation from the wheelchair itself.

These and other objects will become more readily evident from the reading of the accompanying specification and drawing, which are by way of exemplification of the invention. The disclosure is not limited to the embodiment shown, but is more effectively defined by the appended claims.

SUMMARY OF THE INVENTION

The present invention provides an accessory device which is selectively mountable on the existing rigid, framework of a wheelchair. Such a displaceable device presents a pair of upwardly projecting, weight-bearing, push-up handles that facilitate an invalid's shifting of his torso, as will be described. The device also permits independent torso elevation to the erect position (while the chair is braked), permitting user self-transfer to other means of torso support or activity. The device comprises a manual handle means (identically provided for on each lateral side) having a first rigid tubular member of a first diameter that is positioned slantingly, but is doubly anchored so as to straddle the upper and lower horizontal members of the wheelchair framework, and is further provided with a normally open, upper longitudinal end. The first member is engaged proximal to each of its longitudinal ends with a pair of like bracket means, each of which bracket means concurrently secures the first member permanently to the horizontal framework by similarly grasping the frame member.

A second rigid tubular member is provided, but which has an open longitudinal end of a somewhat reduced diameter, such that it can then telescopically engage, and readily slide axially within the premounted first tubular member to a preset (but variable) degree of engagement. The other longitudinal end (upper) of the second tubular member is preferably provided with a capping resilient material sleeve, that is adapted and comfortable to manual gripping by the invalid. An arrest mechanism is locateable in a variable position along the middle segment sidewall of the first tubular member. It is anchored by placement in any one of a plurality of linearly arranged ports sized to receive the shaft of the bolt element of an arrest assembly, which assembly has a removable lug at its inner end(located inwardly of the sidewall). The arrest mechanism is located proximal to the optimally desired, engaged position for the telescoped longitudinal lower end of the second member. The arrest mechanism thus serves to present a finite degree of overlap between the telescopically engaged first and second tubular members. This minimum degree of engagement must be sufficient to cope with the invalid body weight imposed on the push-up bars when in use.

While in the operable mode, it is desired to preclude the telescoped grippable members engagement from inadvertent displacement. An extensible, flexible and resilient cord (Bungee-type) is suspended internally between the distal lower open end of the anchored first tubular member and extending up to the distal upper longitudinal end of the second member (hand gripping end). The cord is sized to be significantly stretched when in the operating mode, thus serving to maintain the telescopic engagement, but still able to yield to modest axial manual exertion, and uncoupling, at the choice of the chair user. When the upper member is displaced, it then depends limply adjacent to wheelchair framework until it is needed for reuse. This leashed dependency neatly avoids misplacing of the upper gripping member, while still making convenient its displacement to a non-interfering position at all times of disuse. Naturally, an identical device (mirror image as to bracketing) is required on the opposing lateral side of the invention, to provide a balanced set of spaced apart push-up bars.

DETAILED DESCRIPTION OF THE PREFERRED EMBODIMENTS

Figures 1, 2, 3, 4, 5:
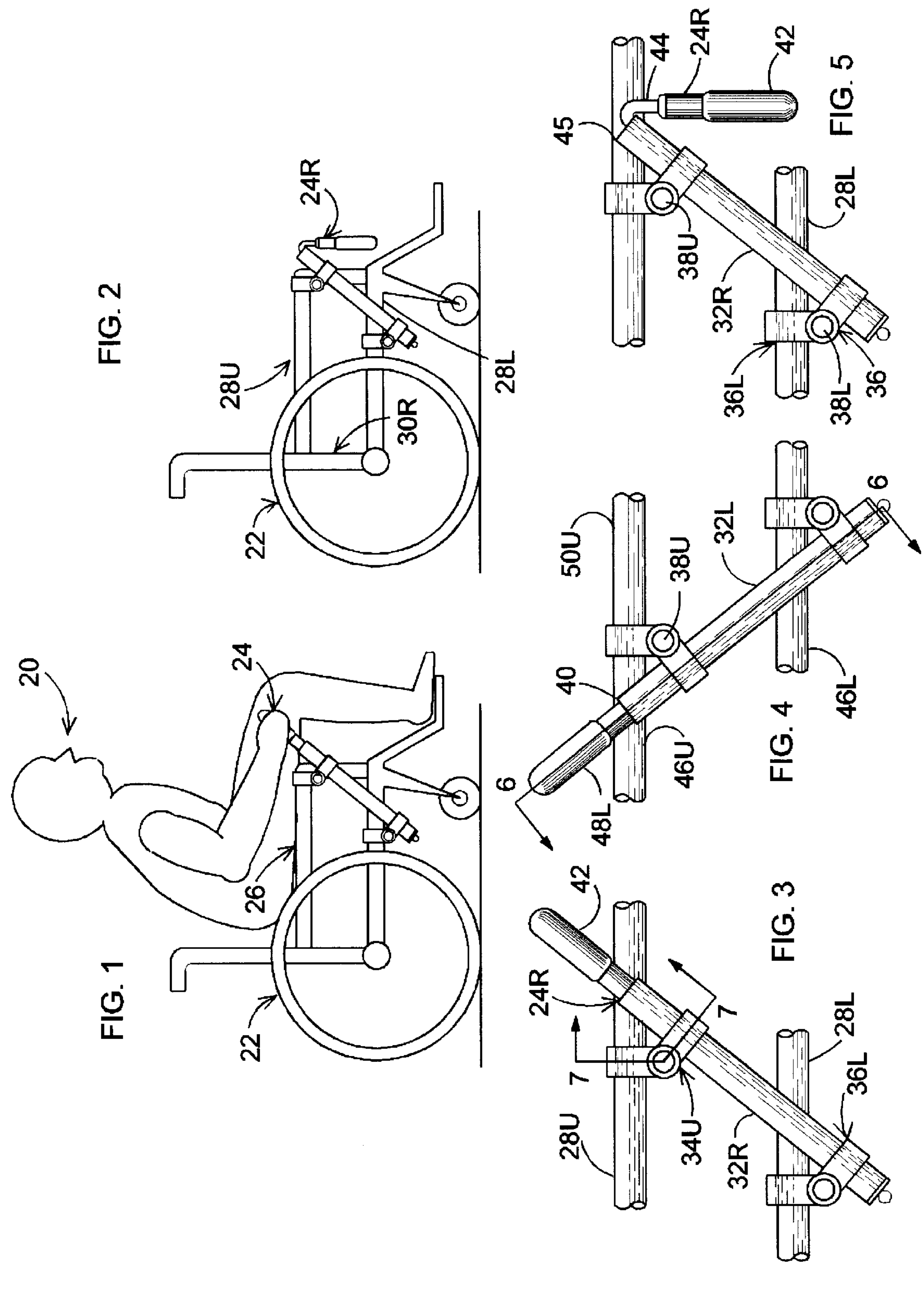
FIG. 1 is a schematic right side view (perspective) of an invalid seated in a wheelchair (modified) employing the device of the present invention, and about to self-levitate himself from the seated position by constructive use of existing arm strengths.
FIG. 2 is another schematic view and elevational view of the same armless wheelchair, but with the invalid absent, depicting a typical frame mounting position for the push-up, accessory device of the invention, but in the non-operating configuration.
FIG. 3 is an enlarged broken-away segment of the modified wheelchair frame of FIGS. 1/2, better revealing the detail of the inventive device juxtaposition thereto, still located on the right hand, lateral side of the wheelchair framework.
FIG. 4 is another elevational view serving to depict the device of FIG. 3, serving as the other member of the paired accessory devices seen in its left hand operative mode; and, FIG. 5 is the same device, seen in its non-operative right hand mode of FIG. 2, with the depending handle tube in close juxtaposition, but still reliably leashed to the wheelchair framework for sudden reactivation.

Referring now to the drawing, and firstly to FIG. 1 in particular, by way of illustration, there is depicted schematically an invalid, generally 20, seated in a braked wheelchair 22, portrayed in the act of using the dual set of push-up handles 24L/R (to levitate himself independently), with the object of moving off the wheelchair seat and/or to another support means (not seen). It will be evident that the push-up device 24, when operable as shown, extends angularly outward of the chair forward edge for balancing. It also projects well above the plane 26 of the wheelchair itself. As will be described later, a means is provided for variation in the extension height of the gripping portion 24, so as to accommodate users of varying heights and girths.

As is better seen in FIG. 2, the push-up device 24R has been adapted to be rigidly mounted to the upper and lower horizontal bars (28U/L) of the right side framework 30R of the wheelchair. Bar 24 is located clear of the other moveable components (wheels, etc.) of the chair, when they are in the operational mode. In the broken away, enlarged view of the device of FIG. 3, the mounted push-up assembly 24R can be better observed. The lower anchor tube 32 is locked into two, double channel, U-shaped clamps, acting as interconnecting brackets 34U/36L. Upper bracket 34U engages upper horizontal bar 28U, somewhat forwardly (purposefully) of the position of that where lower bracket 36L engages lower horizontal bar 28L, thus providing the depicted forward slant for the anchored tubular member 32R.

Each of the common axis brackets (34, 36) is readily swiveable via its axial bolt 38U/L (FIG. 4), to whatever degree of slant is dictated by the fixed distance between the framework horizontal bars 28U/L. A standard hexagonal head nut is depicted as the retaining means at each longitudinal end of the bracket. The push-up device 40 of FIG. 4 is located on the other lateral side, and employs identical components to support gripping bar 48L, being the mirror image of 24R.

The elevational break-away view of FIG. 5 (right side assembly) depicts the non-operative alternate mode of the push-up device 24R mounted on wheelchair framework 30R. The user (not seen) has earlier lifted the handle grip member 42, comprising a resilient sleeve, free of the anchor tube, and the handle 42 now depends loosely alongside the chair side via elastic cord 44, anchor tube upper end 45 is below the seat level (see FIG. 2) so as not to inhibit the chair user in the free use of his hands for other activities. A Bungee-type 44 cord ties the limp gripping member 42 to the anchor member 32, to insure reactivation of the push-up accessory at the instance of the user, by its telescopic facile reinsertion into the anchored slanted tube 32R.

Figures 6, 7, 8, 9, 10L, 10U, 11, 12A, 12B, 13, 14:
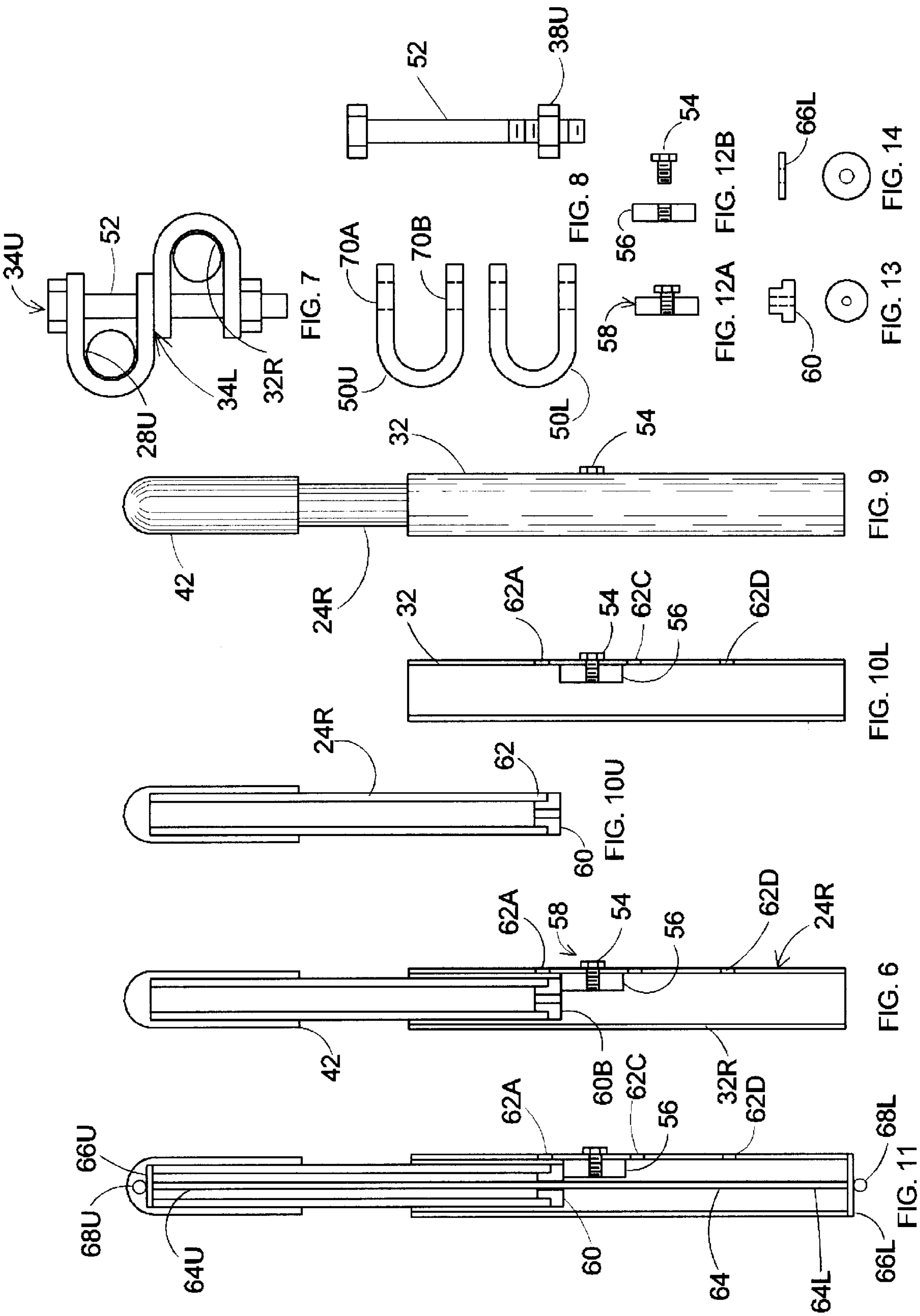
FIG. 6 is a vertical sectional view, taken along line 6—6 of FIG. 4, of one the accessory devices with the component in an operable mode (but omitting the elastic cord), depicting a midway-positioned, arrest component.
FIG. 7 depicts in cross-section, taken along line 7—7 of FIG. 3, a U-bracket assembly for the tubular elements, two of which assemblies concurrently link with (spaced-apart) both of the horizontal chair frame members, with the slanted outer tube only (FIG. 3) of the accessory device, with such as a bracket, permitting axial rotation of the outer tube to one of the functional positions depicted in FIGS. 3, 4, and 5.
FIG. 8 shows the four components of each of the two U-bracket assemblies, spaced apart from the normally linked, frame and tubular members of FIG. 7.
FIG. 9 is an elevational external view of the push-up accessory, isolated from the mounting brackets, partially depicting the inwardly located, horizontally projecting knobbed head of the arrest mechanism.
FIG. 10U/L is a vertical sectional view of the accessory of FIG. 9 (telescoping tubes apart), showing the sidewall-mounted, stop nut fastened, arrest assembly in place, for preselecting the degree of inner tube insertion (retraction)
FIG. 11 is another view of the accessory of FIG. 6, depicting the engaged upper and lower telescoping members, but now made axially secure with the stretched Bungee cord in place.
FIG. 12A/B depicts the arrest mechanism, wholly apart from the outer tube, showing each of its elements in the engaged and disassembled positions.
FIG. 13 is an end-on view of the pressure-fitted sleeve bushing with its central port, which holds one longitudinal end of the Bungee cord within the upper tube (as shown in FIG. 10U)
FIG. 14 is an end-on view of the isolated, washers normally positioned at the lower (and upper) longitudinal ends of the two tubes (FIG. 11), which receive and lock the longitudinal ends of the Bungee cord in its stretched position.

The vertical sectional view of FIG. 6 depicts an isolated push-up assembly 24R, assembled in the operative mode (except to omit the extensible cord normally included). It depicts one midway-positioned, arrest component 58, the inner lug 56 of which is contacting the bottom rim 60B of bushing 60 mounted on inner tubular member 42. The assembly 58 limits the degree of engagement of inner member 42 within normally anchored tubular member 32R.

In FIG. 7, there is seen a vertical sectional view of how upper clamping bracket 34L concurrently engages frame member 28U with left side tubular member 32R (taken along lines 7—7 in FIG. 3). Lower clamping bracket interconnects fram 28L and member 32R, in like manner. It is evident that the axle of assembly 34 permits member 32L to be adapted to a number of degrees of slant when mounted, the specific angle being dependent upon the given gap in the fixed horizontal bars, and/or the extended forward angle of slant desired for device 24R.

Assembly 34U is further depicted in the disassembled view of FIG. 8, comprising identical, rigid U-clamps 50U and 50L, common end-threaded linking bolt 52, and standard locking nut 38U (FIGS. 4/5). Tubular members, like 32R, or frame members, like 28U, with diameters differing from that depicted, can be handled by using U-clamps of comparable internal diameters, and complemental bolt lengths from those shown.

FIG. 9 depicts the unmounted push-bar assembly 24R of FIGS. 1/2 but with the tubular members joined, revealing an intermediate location bolt head 54. The vertical sectional view of FIGS. 10U/10L (with tubular members apart) shows the inner element 56 of assembly 58. Lug-like element 56 is shown in one tube rim arrest position for contacting the reducer insert bushing 60, positioned in the lower end 62 of member 42 (FIG. 10U).

When tubular members 42/32 are in telescopic engagement, they appear internally as shown in FIG. 6. A number of linearly aligned sidewall ports 62A–D are preferably provided in lower member 32R in the same vertical line as assembly 58, each port permitting other arrest positions for assembly 58 (FIGS. 12A/12B).

One further element is required to insure that push-up handle 42 is not displaced from its operative, telescopic engagement with anchor tube 32R by inadvertently manual deflection. Such an element is an elastic cord 64 (FIG. 11) which has a Bungee-like function. Extensible cord 64 is pinned at its lower longitudinal end 64L by closure washer 66L. It passes upwardly through intermediate alignment bushing 60, and is pinned at its upper end 64U by a second closure washer 66U. The anchoring of the cord free ends is simply done by tying enlarging knots, 68L and 68U, respectively, on the cord free ends, which is effected outside their adjacent closure washers. This cord tension is maintained until its aging requires cord replacement. This is readily done by forced withdrawal of the upper tube and cutting the spent elastic cord to permit pulling out of the severed lengths from the washer-closed longitudinal ends.

As alluded to earlier paragraph, FIGS. 12A/12B depicts schematically the two-element, sidewall-mounted arrest mechanism 58.

In FIG. 13, is shown, in isolation, both an elevational and an end view of reducer bushing 60 of FIGS. 6, 10U, and 11, conveniently made of a plastic or elastomeric material to minimize abrasion of the stretched cord 64.

In FIG. 14 is shown the closure of washer 66L of FIG. 11, in both an elevational and end view. The other washer 66U of FIG. 11 is of a like configuration, but is of somewhat reduced diameter to compensate for the reduced diameter of gripping tubular member 42, the end of which it closes (FIG. 10U).

Erection and operation of the push-up means will now be made more fully understandable. Anchor member 32L is loosely fitted with first one U-clamp (34U) of a pair of brackets 34, then another. One clamp (50U) of each pair is located proximal to each longitudinal end of the member 32R/L. The member is aligned slantingly/inclinedly, so that it overlaps the rigid frame members 28U/28L. The still-open other channel of each U-clamp is slipped over the adjacent frame member (either 28U or 28L), the bolt 52 is fully inserted through the abutting U-clamp and boreholes 70A/B, and the clamps are tightened with locknut 38U, until the both members are rigidly engaged in a preset angle of inclination. Arrest mechanism 58 is mounted in one of the optional sidewall ports. Cord 64 is threaded through the open ends of lower anchor tube 321, passes through via washer 66L at its lower longitudinal end and is pinned via terminal knot 68L. The other free end of cord 64 is cut to a suitable length so as to leave enough free end while distended to be threaded through bushing 60 (FIG. 10U) and is extended (while distended) through the upper end of gripping tube 42, passed through washer 66U, and is provided with an outer knot 68U. Unless held out by axial manual exertion, the cord biased upper tube will slide forcefully into anchor tube 32, and present the operative stance seen in FIGS. 1/4.

A like assembly protocol is used to assemble the other lateral side push-up bar of FIG. 4. Once the dual bars are now positioned for invalid usage, as noted, when they are no longer required by the invalid, they are readily disengaged by modest axial lifting of each gripping member. The result is to have such a member out of the way until again needed, limply depending as seen in FIG. 5.

With the foregoing disclosure in mind, it will be apparent that the present invention comprises a manual push-up means, selectively operable on a wheelchair. The tubular parts, the locking assemblies, and extensible cord are available from stock hardware supplies. Their further fabrication into the useful assembly, as depicted and described herein, are well within the skill of the metal fabrication and tube shaping arts.

What is claimed is:

1. In a wheelchair having a bilateral frame structure which includes both a generally horizontal, upper and lower frame members located on each lateral side, and for each lateral framework, a manually-accessible push-up device for a seated invalid which comprises:

(a) a rigid first tubular member that is positioned to straddle the upper and lower frame members and presenting an open upper longitudinal end;

(b) first and second bracket means located proximal to the longitudinal ends of the first member adapted to secure the first member to the upper and lower frame members, respectively;

(c) a rigid second tubular member having an open longitudinal end and an outer diameter reduced sufficiently to permit its telescopic mating with said first member via the open upper longitudinal end of the first member;

(d) an extensible and resilient cord suspended internally between the conjoined open longitudinal end of the first member and the open lower longitudinal end of the second member, which cord tension requires elongation sufficient to bias the engaged two members into a secure interconnection, which is adequate to withstand displacement via inadvertent manual pressure along the projecting segment of the upper second member; and, (e) an arrest mechanism locatable in a variable position intermediate the longitudinal ends of the first outer tubular member and a variable means locateable proximal to the optimal upward projecting position for the second member, being adapted to serve for and maintain a predetermined degree of interengagement between the first and second tubular members for a specific invalid, until manual axial withdrawal effort is exerted thereupon.

2. The push-up device of claim 1 wherein the second tubular member is provided with a resilient sleeve member sized to slidingly engage and enclose the upper longitudinal end thereof.

3. The push-up device of claim 1 wherein the second tubular member is provided with a pressure-fitted bushing adapted to sealingly engage the lower longitudinal end thereof.

4. The push-up device of claim 1 wherein the arrest mechanism comprises a sidewall-mounted arrangement having an elongate fastener with a wrenchable head at one end and lug member threadingly engaged to the shaft of the fastener from the other longitudinal end.

5. The push-up device of claim 1 wherein the variable means comprises a plurality of linearly aligned ports provided in the sidewall of the first member and adapted to provide a like plurality of stop positions for the arrest mechanism.

6. The push-up device of claim 1 wherein the first tubular member is provided with a closure washer sized to make peripheral contact with the lower rim of the first tubular member and also having a borehole of a size sufficient to secure the free end of the elongateable cord to be threaded therethrough.

7. The push-up device of claim 1 wherein the extensible and resilient cord is of a length sufficient that when extended between the upper end of the second member and the lower end of the first member provides an axial retention bias to the engaged members that can only be overcome by manual axial effort on the exposed upper end of the second member.

* * * * *